United States Patent
Suzuki et al.

[11] Patent Number: 6,130,262
[45] Date of Patent: Oct. 10, 2000

[54] METHOD OF PRODUCING POLYESTER AND CHARGING APPARATUS THEREFOR

[75] Inventors: Fumiyuki Suzuki; Tohru Ogura; Yukio Shirokura, all of Shizuoka, Japan

[73] Assignee: Fuji Photo Film Co., Ltd., Kanagawa, Japan

[21] Appl. No.: 09/324,725

[22] Filed: Jun. 3, 1999

[30] Foreign Application Priority Data

Jun. 4, 1998 [JP] Japan .................................. 10-155684
Jun. 10, 1998 [JP] Japan .................................. 10-161561

[51] Int. Cl.$^7$ .................................................. L08J 11/04
[52] U.S. Cl. ........................ 521/48; 528/272; 528/298; 526/64; 526/66; 526/71; 526/88; 366/101; 366/102; 366/150.1; 366/241
[58] Field of Search ..................... 528/272, 298; 526/64, 66, 71, 88; 521/48; 366/101, 102, 150.1, 241

[56] References Cited

U.S. PATENT DOCUMENTS

| | | | |
|---|---|---|---|
| 5,169,977 | 12/1992 | Tanaka et al. | 560/78 |
| 5,432,203 | 7/1995 | DeBruin et al. | 521/48.5 |
| 5,621,983 | 4/1997 | Lundemann et al. | 34/641 |
| 5,770,764 | 6/1998 | Zeitlin et al. | 562/412 |
| 6,018,086 | 1/2000 | Motoyuki et al. | 585/323 |
| 6,057,487 | 5/2000 | Munson et al. | 585/814 |

*Primary Examiner*—Samuel A. Acquah
*Attorney, Agent, or Firm*—Sughrue, Mion, Zinn, Macpeak & Seas, PLLC

[57] ABSTRACT

This invention provides a method of producing polyester and charging apparatus therefor capable of producing a high quality polyethylene naphthalate usable for photographic purpose from recovered polyethylene naphthalate which comprises subjecting an ester-forming derivative consisting essentially of naphthalene dicarboxylic acid or its lower alkyl ester and a diol compound consisting essentially of ethylene glycol to ester exchange reaction or esterification to produce polyethylene naphthalate, wherein recovered polyethylene naphthalate resin is charged before beginning of effusion of alcohol or water which is a by-product of the ester exchange reaction or esterification, and a charging apparatus comprising a slidable inner pipe capable of penetrating through a supply valve.

9 Claims, 6 Drawing Sheets

METHOD OF PRODUCING POLYESTER AND CHARGING APPARATUS THEREFOR

BACKGROUND OF THE INVENTION

This invention relates to a method of producing polyethylene naphthalate (PEN) utilized for recycling recovered PEN resin by incorporating it into the synthesis of PEN, and a recovered polyester-charging apparatus suitable therefor.

Thermoplastic polymer films are widely utilized as packaging films, printing plate support, films for printing, laminated films, support for photograph (movie film, X-ray film, etc.), support of magnetic recording medium or optical disc, or the like.

For example, polyester resin films represented by polyethylene terephthalate (PET) are excellent in dimensional stability, mechanical strength, transparency, etc., and used for fibers, films, sheets, molding materials, such as bottles, supports for photographs, supports for magnetic recording media, etc. A production of PET is disclosed, for example, in Japanese Patent KOKAI 7-207009 wherein polymerization is carried out with controlling vacuum degree of a final polymerization tank according to a specific predict model.

From the past, PET has been widely utilizing as the support of sheet-shaped image forming photosensitive materials, such as roentgen films and lithfilms. Off-specification products and trimmings generated by slitting both longitudinal sides of sheet have been recycled by chopped or pelletized through melt extrusion, and then as recovered material mixed with virgin PET.

On the other hand, polyethylene naphthalate resin having a higher strength has been developing for electric parts, support of magnetic recording materials, bottles and various films, and particularly, photographic film supports, bottles and the like have already been commerciallized.

As the production of PEN, there are the ester exchange method using 2,6-naphthalene dicarboxylic acid dimethyl ester (2,6-dimethylnaphthalate) and ethylene glycol, and the direct polymerization method using 2,6-naphthalene dicarboxylic acid and ethylene glycol as raw materials. In the ester exchange method, 2,6-dimethylnaphthalate and ethylene glycol are charged in an ester exchange reaction tank, ester exchange is conducted at 150 to 260° C. with removing produced methanol as by-product to produce oligomers. In the direct polymerization, 2,6-naphthalene dicarboxylic acid and ethylene glycol are charged in an esterification tank, and esterification is conducted at 150 to 260° C. under ordinary pressure or pressurized conditions with removing produced water as by-product to produce oligomers. In either method, the oligomers are transferred to a polymerization tank, and polycondensation is carried out under reduced pressure with heating while removing produced ethylene glycol as by-product (Japanese Patent KOKOKU 40-3964, 53-24233, Japanese Patent KOKAI 8-73576, etc.).

The production of PEN may be carried out either by batchwise operation or by continuous operation. In the case of batchwise operation, two tanks type, i.e. a combination of an ester exchange reaction tank or esterification tank and a polycondensation tank, is common, and in the case of continuous operation, ususally 3 to 5 tanks are used.

The PEN synthesized by polycondensation is, in general, extruded from a die having tens to hundreds holes several millimeters or less in drameter or a die for molding sheet having a slit, cooled, and cut into flake-shaped or pellet-shaped granules. The granules are conveyed to the subsequent molding and processing processes. However, the PEN taken out of the polycondensation tank can be extruded in strand or sheet, and treated by stretching, orienting, heat setting, etc. to be made into fibers or films, directly.

Although commercial articles of PEN are produced through the above synthesis, molding and processing processes, not all synthesized PEN become commercial articles. For example, in the case of molded articles, such as bottles, defectives generate by various causes, such as short shot due to oil pressure troubles of an injection molding machine or inferior temperature control of molds, roughened surface, contamination with bubbles, abrasions after molding, separation of printing and the like.

In the case of support for photographs and medium for magnetic recording, defectives and unutilizable parts generate, such as ununiformly stretched films generated in the beginning of film production, torn films caused by abnormal temperature of a stretching machine, and even under normal conditions, film edges utilized for grasping upon stretching, conveying or applying a reagent composition are slitted to generate trimmings.

Particularly, in the case of films requiring high quality, such as APS (advanced photo system, e.g. Shashin Kogyo, March, pp27–30, 1996) which is recently commerciallized by utilizing excellent properties of PEN, it was found to be industrially difficult of recycling by the conventional method taken in PET. That is, APS is required a great enlarging magnification, and its commercial value is greatly impaired by very small defects of image. Accordingly, white spots caused by foreign matter in film which shield light cannot be allowed.

Cellulose triacetate (TAC) used for 35 mm negative films can be dissolved in a solvent, and minute foreign matters which causes defects of image can be removed by filtering its solution prepared with a low viscosity at ordinary temperature. However, PEN must be melted for filtration because of no solvent, and it is a problem to filter melted PET having a high viscosity of 5,000 to 7,000 poise at a melting temperature of about 280 to 300° C. for a short period so as not to degrade by thermal deterioration.

In the case of all virgin materials, it is possible a high precision filtration through a relatively small filtration area of a polymer filter, i.e. less deterioration by staying because contamination with foreign matters can be controlled upon manufacturing film. On the other hand, the life of polymer filter is remarkably shortened by using recovered materials containing foreign matters abundantly to degrade productivity. For the purpose of lengthening the life of polymer filter, to increase filter area results in the increase of staying period to accelerate thermal deterioration of the polymer.

Under the circumstances, it is possible to recycle recovered materials in a high grade, such as recovered materials from the support of photographic films, to the other uses, such as packaging films or molded articles, but such a recycling to lower grades is disadvantageous because of the reduction of commercial values. Moreover, in view of meeting the worldwide current of environmental protection, it is preferable to form a closed cycle in the same product, and it is desired to make a complete recycling in its own company without discharging wastes and by-products to the outside of the company.

SUMMARY OF THE INVENTION

An object of the invention is to provide a method capable of recycling recovered articles of PEN resin to photographic uses requiring high quality without degrading the quality of PEN resin, such as lowering of molecular weight and increase of foreign matters, by restraining the differential pressure increase, lowering of life, increase of loss during charging over of the polymer filter having difficulty in handling among PEN synthesis processes, and by restraining the increase of gells and burnt deposits due to staying.

The inventors investigated eagerly in order to solve the above problem, and found that to add recovered polyethylene naphthalate before the beginning of effusion of alcohol or water is particularly effective.

Thus, the present invention provides a method of producing polyethylene naphthalate which comprises subjecting an ester-forming derivative consisting essentially of naphthalene dicarboxylic acid or its lower alkyl ester and a diol compound consisting essentially of ethylene glycol to ester exchange reaction to produce polyethylene naphthalate, wherein recovered polyethylene naphthalate resin is charged before beginning of effusion of alcohol or water which is a by-product of the ester exchange reaction or esterification.

1a, 1b . . . Motor
2a, 2b . . . Speed reducer
3 . . . Ester exchange reaction tank
4 . . . Paddle-shaped stirrer
5 . . . Distillation tower
6 . . . Heat exchanger (cooler)
7 . . . Distillate reservoir
8 . . . Oligomer filter
9 . . . Polycondensation tank
10 . . . Double helix-shaped stirrer
11 . . . Die head
12 . . . Cooling water tank
13 . . . Cooled polymer strand
14 . . . Cutter
15 . . . Polymer pellet
21 . . . Pellet hopper with dryer
22 . . . Melt extruder
23 . . . Filter inlet pressure sensor
24 . . . Filter outlet pressure sensor
25 . . . Filter housing
26 . . . Filter element
27 . . . Die head
28 . . . Casting drum
29 . . . Static electricity impressing electrode
30 . . . Side edge press cast roller
31 . . . Nip roller
32 . . . Amorphous sheet
40 . . . Recovered polyester charging apparatus
41 . . . Inner pipe
42 . . . Recovered polyester storage tank
43 . . . Air cylinder
44 . . . Flexible duct
45 . . . Ball valve
46 . . . Flake charging pipe
51 . . . Reactor nozzle
52 . . . Ball valve
53 . . . Short pipe
54 . . . Inactive gas nozzle
55 . . . Seal ring
56 . . . Bellows
57 . . . Upper flange
58a, b, c . . . Support arm
59 . . . Flange
61 . . . Punching metal wall
62 . . . Inactive gas blowing jacket
63 . . . Inactive gas blowing nozzle
64 . . . Stirrer
65 . . . Motor
66 . . . Speed reducer
67 . . . Flake charging port
68 . . . Pressure gauge
69 . . . Ball valve

DETAILED DESCRIPTION OF THE INVENTION

The principal acid component of the recovered polyethylene naphthalate (PEN) used in the invention is naphthalene dicarboxylic acid, and the principal glycol component is ethylene glycol (EG). A suitable blending rate of the recovered PEN is 5 wt. % or more, preferably 10 wt. % or more and 50 wt. % or less, preferably 30 wt. % or less of produced polyethylene naphthalate (including the recovered PEN).

The polybasic acid used as the ester-forming derivative consists essentially of 2,6-naphthalene dicarboxylic acid, 2,7-naphthalene dicarboxylic acid, 1,5-naphthalene dicarboxylic acid, or their lower alkyl esters ($C_1$–$C_4$), and 2,6-naphthalene dicarboxylic acid dimethyl ester is preferred. It is desirable that the content of the naphthalene dicarboxylic acid and its lower alkyl ester is 80 mol. % or more, preferably 90 mol. % or more of the total polybasic acid. Illustrative of other polybasic acids are aromatic dicarboxylic acids and their derivatives, such as isophthalic acid, terephthalic acid, phthalic acid and diphenyl dicarboxylic acid, and their lower alkyl esters (preferably methyl, ethyl, propyl or butyl ester, particularly preferably methyl ester), alicyclic dicarboxylic acids and their derivatives, such as cyclopropane dicarboxylic aicd, cyclobutane dicaarboxylic acid and hexahydroterephthalic acid, and their lower alkyl esters (preferred ones are as mentioned above), aliphatic dicarboxylic acid and their derivatives, such as oxalic acid, succinic acid, adipic aicd, sebacic acid and dimer acids, and their lower alkyl esters (preferred ones are as mentioned above).

The glycol used as the diol compound consists essentially of ethylene glycol, and it is desirable that the content of ethylene glycol is 80 mol. % or more, preferably 90 mol. % or more, of the total glycols. Illustrative of other glycols are propylene glycol, trimethylene glycol, diethylene glycol, tetramethylene glycol, hexamethylene glycol, neopentylene glycol, p-xylene glycol, 1,4-cyclohexane dimethanol, bisphenol A, p,p'-diphenoxysulfone, 1,4-bis(β-hydroxyethoxy) benzene, 2,2-bis(p-β-hydroxyethoxyphenyl)propane, other polyalkylene glycols, p-phenylenebis(dimethylol cyclohexane), etc.

A suitable molar ratio of the polybasic acid to the glycol is about 1:1.7 to 1:3, preferably about 1:2.1 to 1:2.4 as the ratio of carboxyl groups (including its derivative groups capable of reacting with alcoholic hydroxyl group, such as ester group) of the polybasic acid: alcoholic hydroxyl groups of the glycol.

In the production of the polyester resin of the invention, each known catalyst can be used for the esterification, ester exchange reaction, and polycondensation.

In order to accelerate the esterification, or for the ester exchange reaction, the following catalyst can be used, such as manganese acetate, cobalt acetate, magnesium acetate, calcium acetate, cadmium acetate, zinc acetate, lead acetate, magnesium oxide, lead oxide or combinations thereof. A suitable amount of the catalyst is about 30 to 100 ppm.

Phosphoric acid, phosphorous acid or an ester compound thereof may be added as heat stabilizer.

The ester exchange reaction can be carried out by maintaining at about 150 to 260° C., preferably about 190 to 230° C., for about 0.5 to 4 hours. While, stirring can be conducted for the uniform proceeding of reaction. By the initiation of ester exchange reaction or esterification, alcohol or water begins to effuse. In the invention, the recovered PEN resin is added before the beginning of the alcohol or water. Once alcohol or water vapor generates, the difficulty of charging of the recovered PEN resin increases, and moreover, depolymerization is restrained with the consumption of ethylene glycol by the reaction. The charging of the recovered PEN may be not strictly before the effusion of alcohol or water, but can be slightly later than that, for example up to proceeding of 20% of ester exchange reaction or esterification. The charged recovered PEN resin is depolymerized to liquefy during proceeding of the ester exchange reaction.

In any event, since the reaction tank is always impregnated with vapors, such as high temperature ethylene glycol vapor, there is a difficulty in charging of the recovered PEN resin. When the recovered PEN resin is in a form of relatively large grains such as having a size of centimeters, the charging is not so difficult. However, when the crushed recovered PEN is powder or flakes, it is electrified to adhere around a charging nozzle and grows. Moreover, since the nozzle, a valve which closes the nozzle and their circumferences are wetted by the vapor in the reaction tank, the powder or flakes are liable to adhere to there. The adhered matter bites the valve to inhibit its closing. Since PEN has a high rigidity, once the adhered matter, even flakes having a size of about 100 µm, forms a bridge and is consolidated, the removal of the adhered matter is not easy. As a result, vapor in the reaction tank, such as ethylene glycol vapor and methanol vapor, flows into the nozzle, piping and a recovered PEN storage tank through the opened valve, and consolidates the recovered PEN in the tank. Thus, operation cannot be continued.

A solving means therefor is to charge recovered PEN flakes together with a large quantity of inactive gas. However, in order to prevent the adhesion and consolidation around the valve, a flow velocity of 10 m/sec or more is necessary, and therefore, a large quantity of inactive gas is delivered into the reaction tank. As a result, not only cost is increased, but also crushed fine recovered PEN and sublimates of naphthalene dicarboxylic acid di-lower alkyl ester are blown into a distillation tower annexed to the ester exchange reaction tank to induce clogging troubles at the lower part of the tower. Once clogging occurred, it is necessary to wash the distillation tower with solvent or to take out and wash the packings of the tower. When a vent line for exclusive use is provided, the sublimates and fine powder are also liable to adhere to the vent line, and clogging troubles occur. Moreover, a part of ethylene glycol which has been mattered and charged in the reaction tank is escaped through the vent line, and reaction does not proceeds normally.

The inventors investigated to develop a mean for charging the recovered PEN resin into an ester exchange reaction tank stably for a long period without clogging charging pipe, valve and distillation tower by the recovered PEN resin.

Then, they found that, by using a sidable inner pipe and streaming inactive gas in the inner pipe at a flow velocity of 10 cm/sec or more, the recovered PEN resin can be charged stably through the inner pipe without blocking, and motion troubles of the valve do not occur. The means is also applicable to other polyesters.

Thus, the recovered polyester-charging apparatus comprises a slidable inner pipe inserted in a nozzle attached to a reactor, a driving mechanism which moves the inner pipe, and a feeding mechanism of crushed recovered polyester and inactive gas into the inner pipe, and the charging method comprises using the sidable inner pipe and streaming inactive gas in the inner pipe at a flow velocity of 10 cm/sec or more.

In the above means, direct contact of the recovered polyester to the sliding portion of the valve is prevented by inserting the inner pipe penetrated through the valve, and consolidation of the recovered polyester on the charging apparatus is prevented by streaming inactive gas in the inner pipe at a flow velocity of 10 cm/sec or more. Moreover, the adhering and consolidation of the recovered polyester to the charging apparatus is prevented by restraining the entering of inactive gas into the reaction tank. After charging of the recovered polyester is finished, the valve can be closed by lifting the inner pipe until the lower end is passed through the valve portion.

The reactor to which the charging apparatus is an ester exchange reaction tank, an esterification tank or the like, and the reactor is, in principle, in a closed structure.

The nozzle supports the inner pipe in a slidable state, and closes the space between the inner pipe and the wall of reactor. The position of the nozzle is upper than the liquid level, and usually, the top of the reactor. A sealer, such as a seal ring may be provided for sealing the space between the nozzle and the inner pipe. However, in order to inhibit entering of recovered fine polyester, ethylene glycol vapor, sublimates of naphthalen dicarboxylic acid di-lower alkyl ester and the like into the space, it is preferable to stream inactive gas between the nozzle and the inner pipe toward the inside of the reaction tank. The lower end of the nozzle may be projected or not projected into the reactor, but preferably located considerably apart from the liquid level of the reaction solution.

A suitable material of the inner pipe is stainless steel, and as to the portion of the inner pipe to be inserted into the reactor, both of the inner surface and the outer surface are preferably finished smooth. Effective surface treatments are buffing of #400 or more, electrolytic polishing, carbon-containing Teflon lining and the like. It is also effective against adhesion of flakes and blocking that the inner pipe itself is made of ceramic or the like. Although a suitable size of the inner pipe varies according to the capacity of the reactor, in common, the inner pipe has an inside diameter of about 25 to 250 mm, especially about 50 to 150 mm, and a length of about 500 to 1200 mm. The lower end of the inner pipe is, in principle, made so as to be located always upper than the level of the reaction solution. The movement of the inner pipe is carried out before and after charging of the crushed recovered polyester, and usually, it is not necessary to move the inner pipe while charging.

As the driving mechanism for moving the inner pipe, known means are usable, such as air cylinder, hydraulic cylinder, a combination of various gears or the like.

The inactive gas for purging crushed recovered polyester so as not to adhere and not to be consolidated does not react with raw materials and reaction products, and illustrative of the inactive gases are nitrogen, helium, argon, carbon dioxide, etc. It is preferable to stream the inactive gas not only on the inside of the inner pipe but also on the outside where the inner wall of the valve is exposed. A suitable flow velocity of the inactive gas is 10 cm/sec or more, preferably 20 cm/sec or more, and less than 10 m/sec, preferably 5 m/sec or less, particularly preferably 3 m/sec or less.

The crushed recovered polyester is pneumatically conveyed to a recovered polyester storage tank, and supplied to the reactor. The stirring of the storage tank is not necessary to use a stirrer having stirring blade but may be bars radially projected from the main shaft, helical rotor or the like. A bar-shaped vibrating bridge breaker can also be used.

Through the ester exchange reaction, monomer to oligomers up to about tetramer are mainly produced. The reaction solution is preferably filtered prior to subjected to polycondensation. For photographic purpose, it is preferable to use a filter capable of checking suspensoids having a diameter of about 5 $\mu$m, in order to remove foreign matters causing defects in optical image.

Subsequently, the reaction solution is transferred to a polycondensation reactor, and polycondensation is carried out. As the catalyst of the polycondensation, there are antimony trioxide, antimony pentaoxide, antimony trifluoride, antimony sulfide, antimony tributyrate, antimony ethylene glycolate, potassium antimonate, antimony acetate, antimony trichloride, germanium dioxide, germanium trioxide, manganese acetate, zinc acetate, lead acetate, benzoates, titanium alkoxide, titanic acid alkali metal salts, and combinations thereof. A suitable amount of the catalyst is about 100 to 300 ppm.

The polycondensation is carried out by maintaining at about 230 to 300° C., preferably about 230 to 280° C., for about 1 to 5 hours. The pressure is, in general, gradually reduced with reference to the production rate of by-product, finally up to 1 torr or less. Instead, the reaction may be accelerated by introducing inactive gas, such as $N_2$ gas, without reducing pressure.

The reaction apparatus may be batchwise type or continuous type.

To the PEN resin of the invention, additives may be added, such as other metal compound, nitrogen-containing basic compound, antioxidant, lubricant, antistatic agent, UV absorber, fluorescent brightening agent, pigment, dye, light-shielding agent, filler or the like. They may be added in the polycondensation process or before or after that.

EXAMPLES

Figure 1:
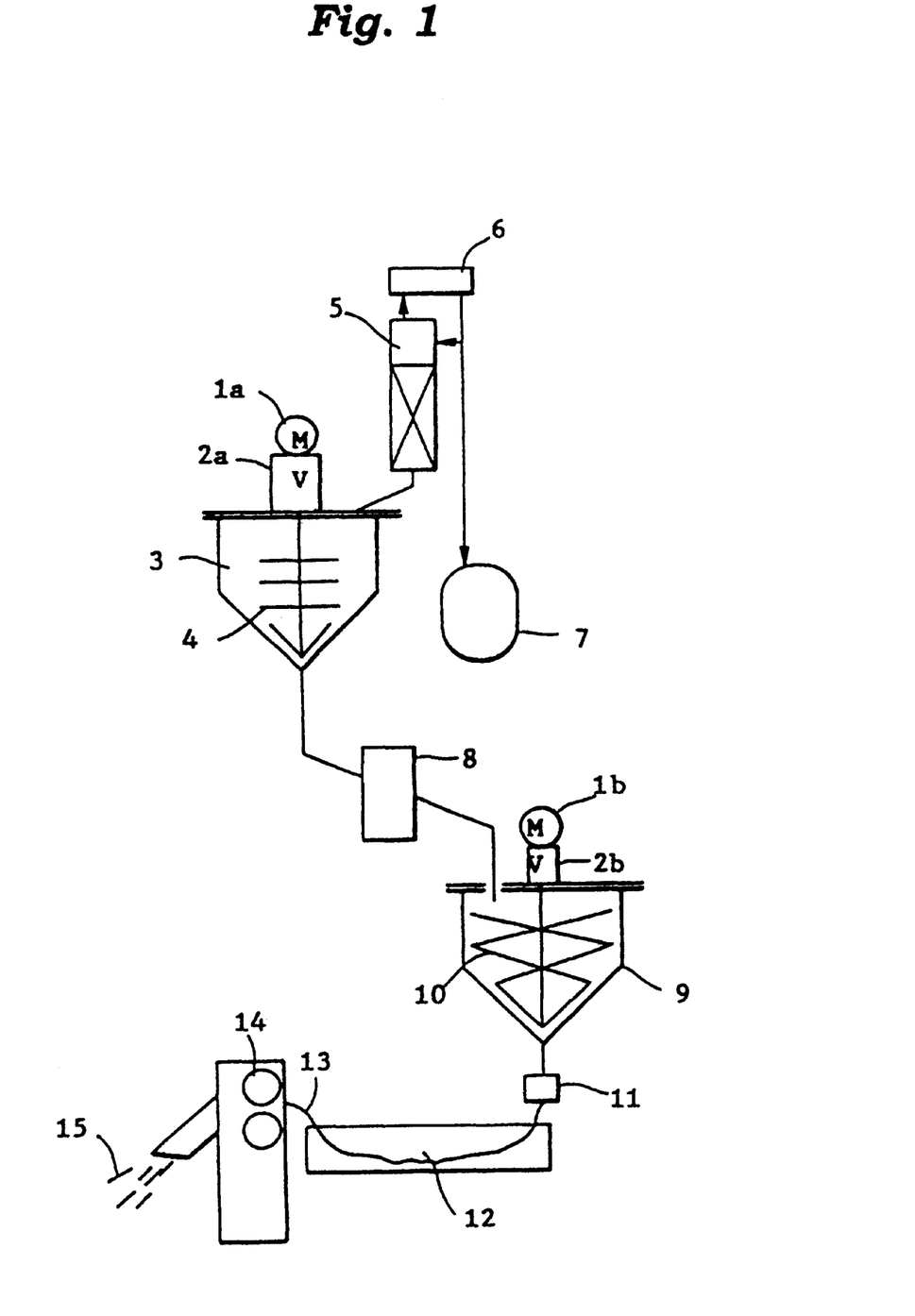
FIG. 1 is a schematic view illustrating the construction of a PEN manufacturing apparatus used in the examples.

A batchwise-type manufacturing apparatus shown in FIG. 1 was employed in the following examples and comparative examples. The apparatus was partially reconstructed of a conventional apparatus used for direct polymerization of terephtharic acid and ethylene glycol to produce polyethylene terephthalate and the like.

The apparatus is composed of an ester exchange reaction tank 3 and a polycondensation tank 9. The capacity of both tanks is about 45 l, respectively. To the ester exchange reaction tank 3, a paddle-shaped stirrer 4 is mounted which rotates driven by a motor 1a through a speed reducer 2a, and a distillation tower 5 is connected to the top of the reaction tank 3. A distillate reservoir 7 for receiving the distillates is connected to the distillation tower 5 through a heat exchanger 6.

Figure 3:
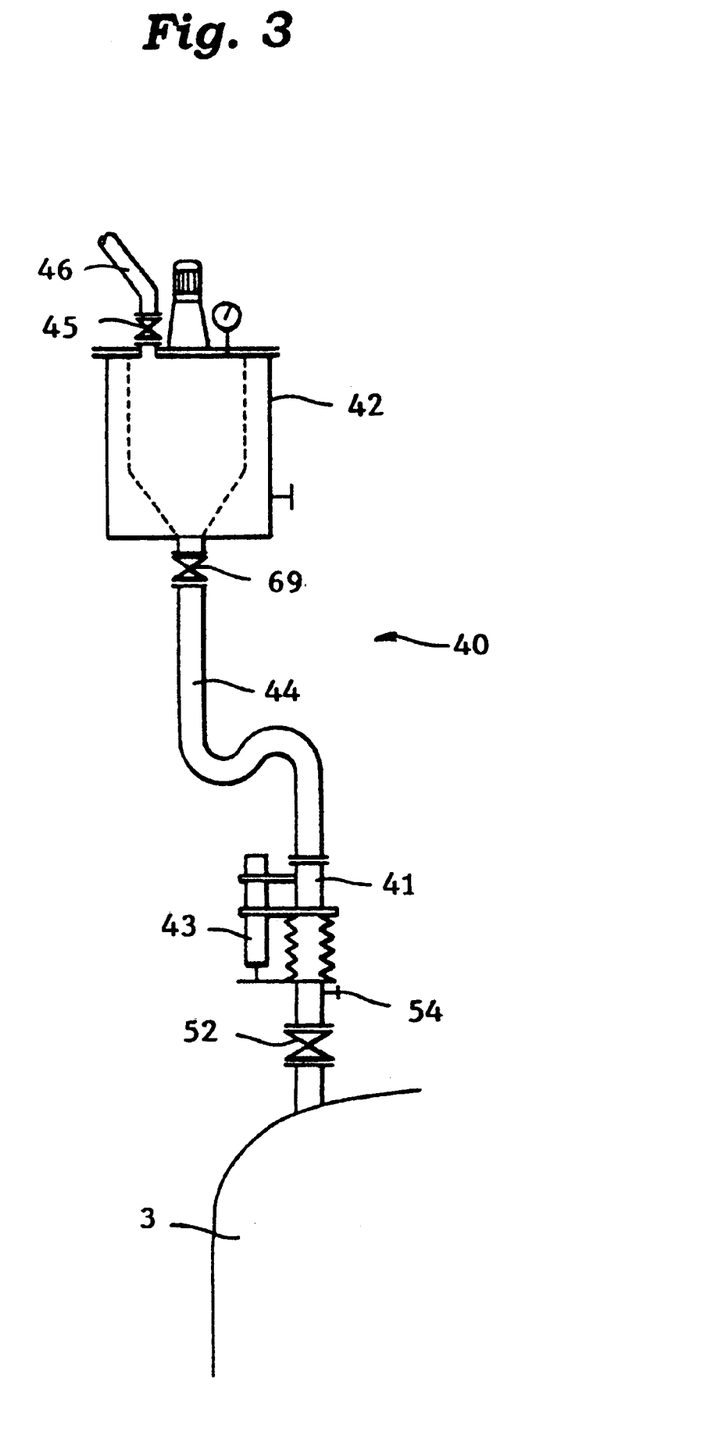
FIG. 3 is a side view illustrating an attached state of a recovered polyester charging apparatus to a reactor.

A recovered polyester charging apparatus 40 (not illustrated in FIG. 1) having a capacity of about 30 l is connected to the top of the ester exchange reaction tank 3 as shown in FIG. 3. The charging apparatus 40 is composed of a recovered polyester storage tank 42 and a slidable inner pipe 41.

Figure 4:
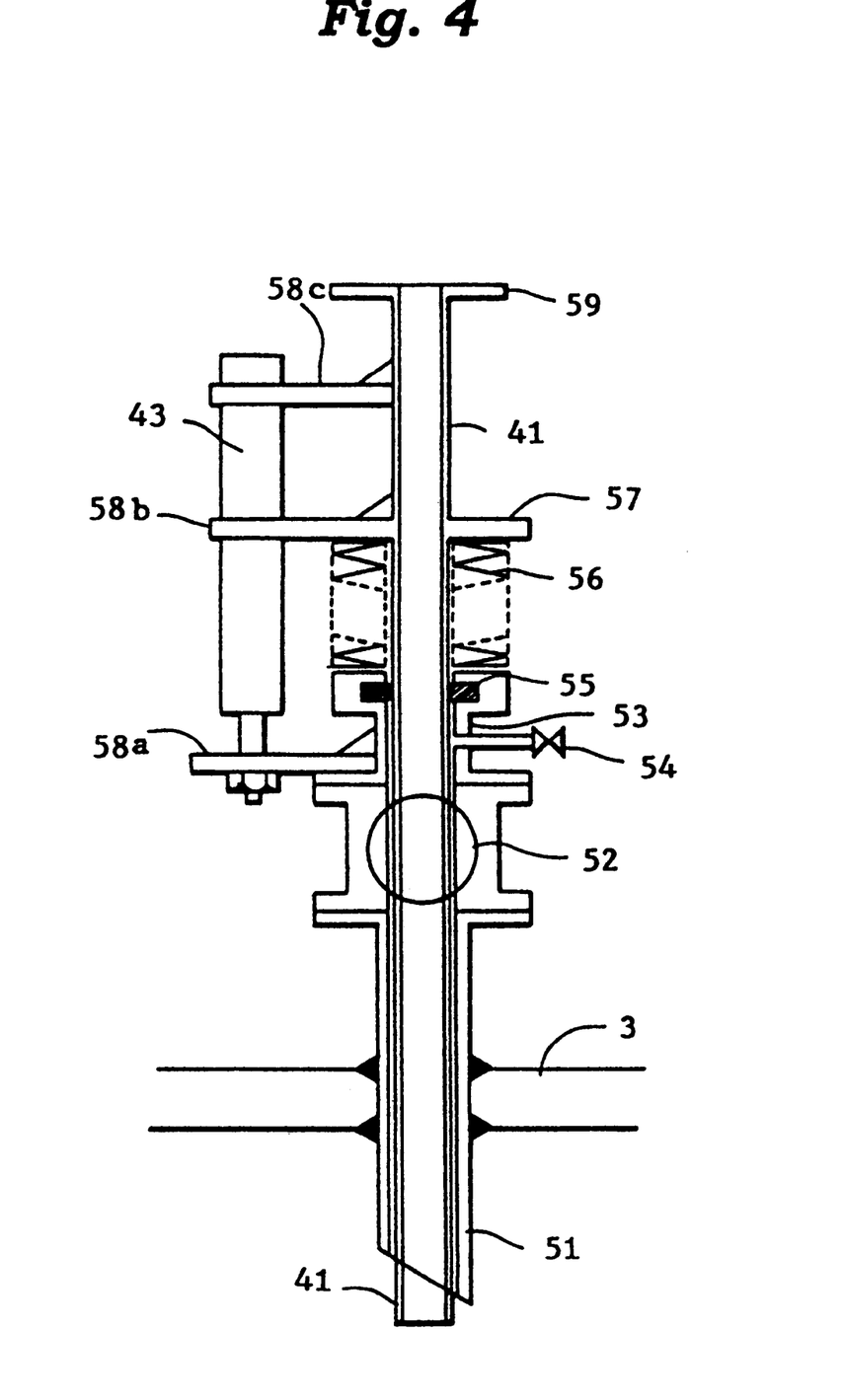
FIG. 4 is a longitudinal section around an inner pipe portion thereof.

Details around the inner pipe 41 is shown in FIG. 4. As shown in the figure, the inner pipe 41 is a straight cylindrical pipe, and slidably inserted into a reactor nozzle 51 which penetrates the upper wall of the reaction tank 3 and is welded thereto. A ball valve 52 is attached to the upper end flange of the nozzle 51. A short pipe 53 is connected to the upside of the ball valve 52, and an inactive gas nozzle 54 for purging between the inner pipe 41 and the nozzle 51 is connected to the short pipe 53. The upper end of the short pipe 53 is sealed by a seal ring 55, and is connected to a bellows 56. The inner pipe 41 is provided with an upper flange 57 at the upper part, and the other end of the bellows 56 is fixed to the upper flange 57. Three support arms 58a, 58b, 58c are provided horizontally at the short pipe 53, the upper flange 57 and the further upper side wall of the inner pipe 41, respectively, and an air cylinder 43 for moving the inner pipe 41 is fixed to the support arms 58a, 58b, 58c. A further flange 59 is formed at the upper end of the inner pipe 41, and a flexible duct 44 (not illustrated) is connected thereto.

Figure 5:
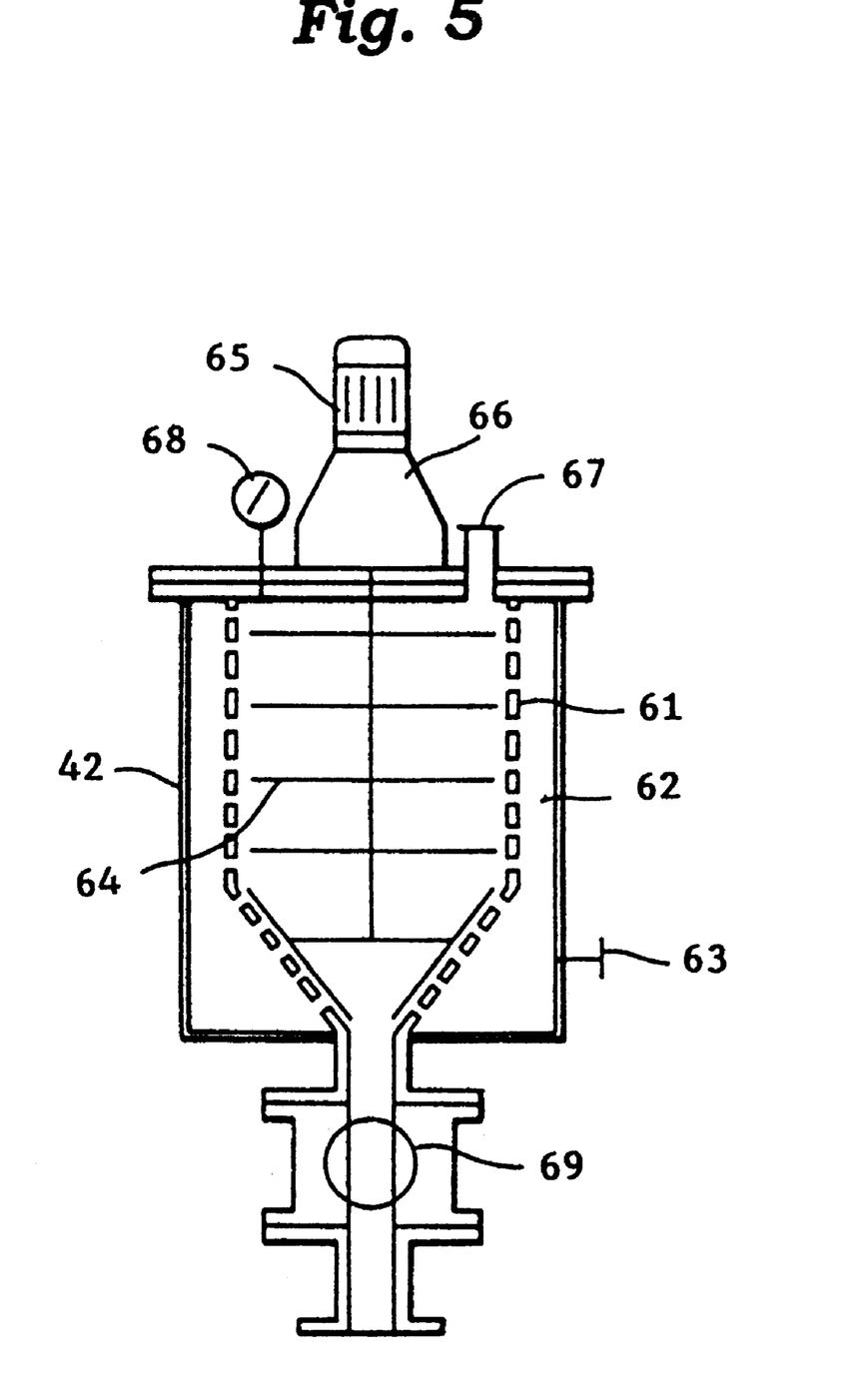
FIG. 5 is a longitudinal section around a recovered polyester storage tank.

Details around the recovered polyester storage tank 42 is shown in FIG. 5. As shown in the figure, the storage tank 42 is a cylindrical tank provided with a punching metal wall 61 having many punched holes. The upper part of the punching metal wall 61 is cylindrical and the lower part is inverted cone shaped. The space between the punching metal wall 61 and the inner wall of the storage tank 42 is an inactive gas blowing jacket 62 portion. Inactive gas is blown from an inactive gas blowing nozzle 63 located in the lower part of the storage tank 42. A stirrer 64 is provided located on the inside of the punching metal wall 61, and rotates by the driving of a motor 65 mounted at the top of the storage tank 42 through a speed reducer 66. The storage tank 42 is further provided with a flake charging port 67 and a pressure gauge 68 at the top, and a ball valve 69 at the bottom. The flexible duct 44 (not illustrated) is connected to the underside of the ball valve 69.

As shown in FIG. 3, a flake charging pipe 46 is connected to the flake charging port 67 at the top of the recovered polyester storage tank 42 through a ball valve 45. The ball valve 69 at the bottom is connected to the upper end of the inner pipe 41 by the flexible duct 44.

The bottom of the ester exchange reaction tank 3 is connected to an oligomer filter 8, and further connected to the top of the polycondensation tank 9 therefrom.

To the polycondensation tank 9, a double helix-shaped stirrer 10 is mounted which rotates by the driving of a motor 1b through a speed reducer 2k. The bottom of the tank 9 is connected to a die head 11, end further connected a cooling water tank 12 and a cutter 14 in this order.

Heaters are attached to the ester exchange reaction tank 3 and the polycondensation tank 9.

The ester exchange reaction proceeds by charging polybasic acid, glycol, recovered PEN resin, catalyst, etc. and heating with stirring. The vapor generated entered the distillation tower 5, and condensed ethylene glycol returns to the reaction tank 3. Methanol is cooled to be liquefied at the heat exchanger 6, and accumulated in the reservoir 7. After the reaction is finished, the reaction solution is filtered by the oligomer filter 8, and enters the polycondensation tank 9. The polycondensation proceeds there by adding a polycondensation catalyst, heating, sucking and stirring. After the reaction is finished, the melted polymer in the tank 9 is extruded from the die head 11 in strand, solidified in the cooling water tank 12, and cut by the cutter 14 into pellets 15.

Figure 2:
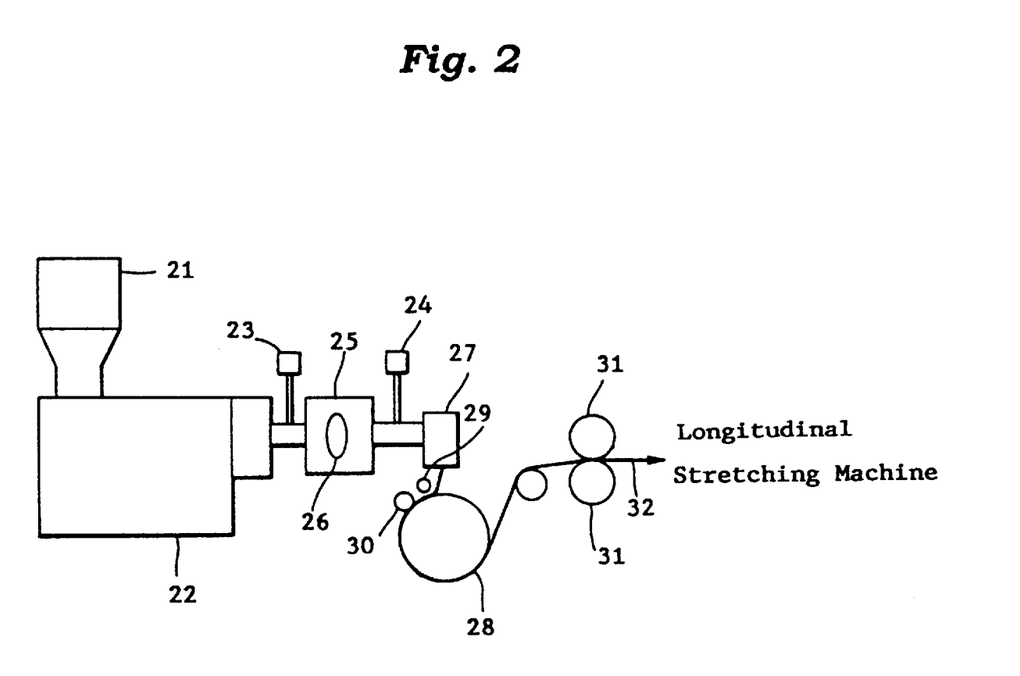
FIG. 2 is a schematic view illustrating the construction of a melt extruder for the production of sheet from pellets manufactured by the above PEN manufacturing apparatus.

The melt extrusion apparatus used in the examples and comparative examples is shown in FIG. 2.

The apparatus is composed of a pellet hopper 21 with a dryer, a melt extruder 22, a filter housing 25 containing a filter element 26, a die head 27, a casting drum 28 and nip rollers 31. Pressure sensors 23, 24 are attached to the inlet and the outlet of the filter housing 25. The casting drum 28 is provided with a static electricity impressing electrode 29 and side edge press cast rollers 30.

In the above melt extrusion apparatus, after drying at 160° C. for 10 hours under reduced pressure, PEN pellets are extruded by the extruder 22 at 295° C., and molded into sheet on the casting drum 28 at 80° C. through the polymer filter 26 made of stainless steel capable of trapping 3 μm spherical particles at a rate of 100%. The amorphous sheet molded is stretched by a longitudinal stretching machine (not illustrated) and a lateral stretching machine (not illustrated) to form a biaxially oriented PEN film.

The longitudinal stretching can be achieved by passing the extruded sheet through two pairs or more of nip rollers different in peripheral speed with heating. The lateral stretching may be preceded to the longitudinal stretching. According to the draw ratio, stretching temperature conditions and the like, uniform stretched film having less uneven thickness can be obtained by preceding the lateral stretching.

Analyses of PEN in the following examples and comparative examples are as follows:

Measurement of Intrinsic Viscosity (IV)

Each PEN film was dissolved in a mixed solvent of phenol and 1,1,2,2-tetrachloroethane (3:2 by weight ratio), and viscosity was measured by an Ubbellohde viscometer at 25° C.

Measurement of Foreign Matters in Film

An arbitrary 5 mm square part of each biaxially stretched PEN film was observed by a polarization microscope (40× magnification), and the number of polarized parts caused by void portions surrounding foreign matters was counted. Subsequently, color and longitudinal length of each foreign matter were measured by a high magnification microscope in a state of detaching the polarization plate.

The above operations were carried out 5 to 20 times according to the quantity of foreign matters.

"parts" in the following examples and comparative examples is parts by weight.

Comparative Example 1

(Production of PEN)

123 parts of 2,6-naphthalene dicarboxylic acid dimethyl ester (NDCM) and 80 parts of ethylene glycol (EG) were charged in the ester exchange reaction tank. 0.036 part of manganese acetate tetrahydrate against the theoretical produced amount of the polymer was added as the ester exchange catalyst with stirring, and heated up to 200° C. with stirring. The reaction temperature was gradually elevated to 235° C. with extracting methanol produced as a by-product through the reaction to the distillate reservoir.

The reaction proceeded with keeping at 235° C. After the generation of methanol was finished, the reflux temperature was set 200° C. to extract excess EG to the distillate reservoir.

Thereafter, the reaction product was transferred to the polycondensation tank through a filter made of stainless steel capable of trapping 5 μm spherical particles, and 0.037 part of trimethyl phosphate and 0.020 part of germanium dioxide were added.

The temperature of the heat transfer oil jacket equipped on the outer surface of the polycondensation tank was elevated from 255° C. to 285° C. at a rate of 5° C./min, while the inside of the tank was gradually sucked up to 0.3 tarr. The polycondensation was carried out for about 2 hours, while keeping the above conditions. The polymer viscosity was calculated using the indicated value of the torque meter attached to the stirrer. When the polymer viscosity became 6,000 poises, the polymer was extruded from the polycondensation tank by nitrogen pressure, and pelletized by passing the die head, the cooling water tank and the cutter.

(Manufacture of PEN film)

After drying the PEN polymer pellets thus obtained at 160° C. for 10 hours under reduced pressure, they were extruded by the extruder at 295° C. into sheet on the casting drum at 80° C. through the polymer filter made of stainless steel capable of trapping 3 μm spherical particles at a rate of 100% and the die head to form an amorphous sheet 90 μm in thickness. The sheet was stretched 2.8 times in the longitudinal direction (lengthwise direction) at a surface temperature of 120° C., followed by stretching 3.3 times in the lateral direction at 145° C. Subsequently, heat setting was carried out at 255° C. for 2 seconds to obtain a biaxially stretched PEN film 90 μm in thickness.

Example 1

(Production of PEN)

PEN flakes were prepared from photographic negative film having a PEN film 90 μm in thickness by removing the coating layers, such as photosensitive layers by an alkali solution, washing, drying, followed by crushing into fine pieces. 96 parts of NDCM, 71 parts of EG and 41 parts of the above recovered PEN were charged in the ester exchange reaction tank. 0.036 part of manganese acetate tetrahydrate was added as the ester exchange catalyst with stirring, and heated up to 200° C. with stirring. The reaction temperature was gradually elevated to 235° C. with extracting methanol produced as a by-product through the reaction to the distillate reservoir.

The reaction proceeded with keeping 235° C. After the generation of methanol was finished, the reflux temperature was set 200° C. to extract excess EG to the distillate reservoir.

Thereafter, the reaction product was transferred to the polycondensation tank through a filter made of stainless steel capable of trapping 5 μm spherical particles, and 0.037 part of trimethyl phosphate and 0.020 part of germanium dioxide were added.

The temperature of the heat transfer oil jacket equipped on the outer surface of the polycondensation tank was elevated from 255° C. to 285° C. at a rate of 5° C./min, while the inside of the tank was gradually sucked up to 0.3 torr.

The polycondensation was carried out for about 2 hours, while keeping the above conditions. The polymer viscosity was calculated using the indicated value of the torque meter attached to the stirrer. When the polymer viscosity became 6,000 poises, the polymer was extruded from the polycondensation tank by nitrogen pressure, and pelletized by passing the die head, the cooling water tank and the cutter.
(Manufacture of PEN film)

Using the above pellets, a biaxially stretched PEN film 90 μm in thickness was manufactured by the same method as Comparative Example 1.

Comparative Example 2
(Production of PEN)
PEN pellets were prepared by the same method as Comparative Example 1.
(Manufacture of PEN Film)

70 parts of the above PEN pellets and 30 parts of the flakes prepared in Example 1 were mixed. After drying the pellet mixture at 160° C. for 10 hours under reduced pressure, they were extruded by the extruder at 295° C. into sheet on the casting drum at 80° C. through the polymer filter made of stainless steel capable of trapping 3 μm spherical particles at a rate of 100% and the die head to form an amorphous (unstretched) sheet 90 μm in thickness. The sheet was stretched 2.8 times in the longitudinal direction (lengthwise direction) at a temperature of 120° C., followed by stretching 3.3 times in the lateral direction at 145° C. Subsequently, heat setting was carried out at 255° C. for 2 seconds to obtain a biaxially stretched PEN film 90 μm in thickness.

The above three type films were evaluated, and the results are summarized in Table 1.

TABLE 1

|  | Example 1 | Comparative 1 | Comparative 2 |
| --- | --- | --- | --- |
| Intrinsic Viscosity | 0.58 | 0.58 | 0.54 |
| Number of Foreign Matters* | 0–1 | 0–1 | 30– |
| Pressure Loss at Polymer Filter** | 0% | 0% | 4% |
| Evaluation | Practical | Practical | Impractical |

*The number of colored foreign matters having a longitudinal length of 20 μm or more per 10 cm² in area × 90 μm in thickness.
**$\{(P_{24} - P_0)/P_0\} \times 100$
$P_0$ is the indicated value (kg/cm²) of the pressure sensor at the inlet of the polymer filter immediately after the start of the manufacture, and $P_{24}$ is that after 24 hours with a polymer filter load of 40 g/cm² · hr.

Example 2

A batchwise-type manufacturing apparatus shown in FIGS. 1–5 was used.

To the ester exchange reaction tank where the first ester exchange reaction was finished and the reaction solution was transferred to the polycondensation tank by pressurizing with nitrogen, a prescribed amount of melted 2,6-naphthalene dicarboxylic acid dimethyl ester and ethylene glycol were charged. Then, about 6 kg of the recovered PEN flake was charged to the ester exchange reaction tank using the inner pipe with steaming nitrogen gas at a flow velocity of 1 m/sec. The charging of the recovered PEN flakes was finished after 7 minutes, and after extracting the inner pipe, the valve could be closed smoothly.

Then, the ester exchange reaction was allowed to proceed by adding catalyst and additives together with ethylene glycol, and supplying heat transfer oil heated by an electric heater to the heat transfer oil jacket mounted on the outer wall of the reaction tank. Methanol produced as a by-project was gradually extracted with refluxing by the annexed distillation tower.

The reaction solution where the reaction had been finished was transferred to the polycondensation tank by pressurizing with nitrogen, and the recovered PEN flakes were charged by the same method. These operations were repeated 10 batches, and the charging of the recovered PEN flakes could be charged in the period of 7 to 15 minutes. The opening and closing of the valve were smooth over the all operations.

Comparative Example 3

A similar experiment to Example 2 was carried out except that the flow velocity of nitrogen was changed to 5 cm/sec. As a result, clogging of the nozzle occurred, and the valve could not be closed at the third batch of the operation.

Comparative Example 4

A similar experiment to Example 2 was carried out except that the inner pipe was not used, the valve could not closed at the second batch.

Comparative Example 5

Using the same apparatus as Example 2, a prescribed amount of melted dimethyl terephthalate (DMT) and a ethylene glycol were charged. Then, about 6 kg of recovered PET flakes was charged to the ester exchange reaction tank without using the inner pipe while streaming nitrogen gas at a flow velocity of 5 cm/sec. The charging was finished after 10 minutes, and the valve could be closed smoothly.

Then, the ester exchange reaction was allowed to proceed by adding catalyst and additives together with ethylene glycol, and supplying heat transfer oil heated by an electric heater to the heat transfer oil jacket mounted on the outer wall of the reaction tank. Methanol produced as a by-product was gradually extracted with refluxing by the annexed distillation tower.

The reaction solution where the reaction had been finished was transferred to the polycondensation tank by pressurizing with nitrogen, and the recovered PEN flakes were charged by the same method. These operations were repeated 10 batches, and the charging of the recovered PEN flakes could be charged in the period of 8 to 15 minutes. The opening and closing of the valve were smooth over the all operations.

Figure 6:
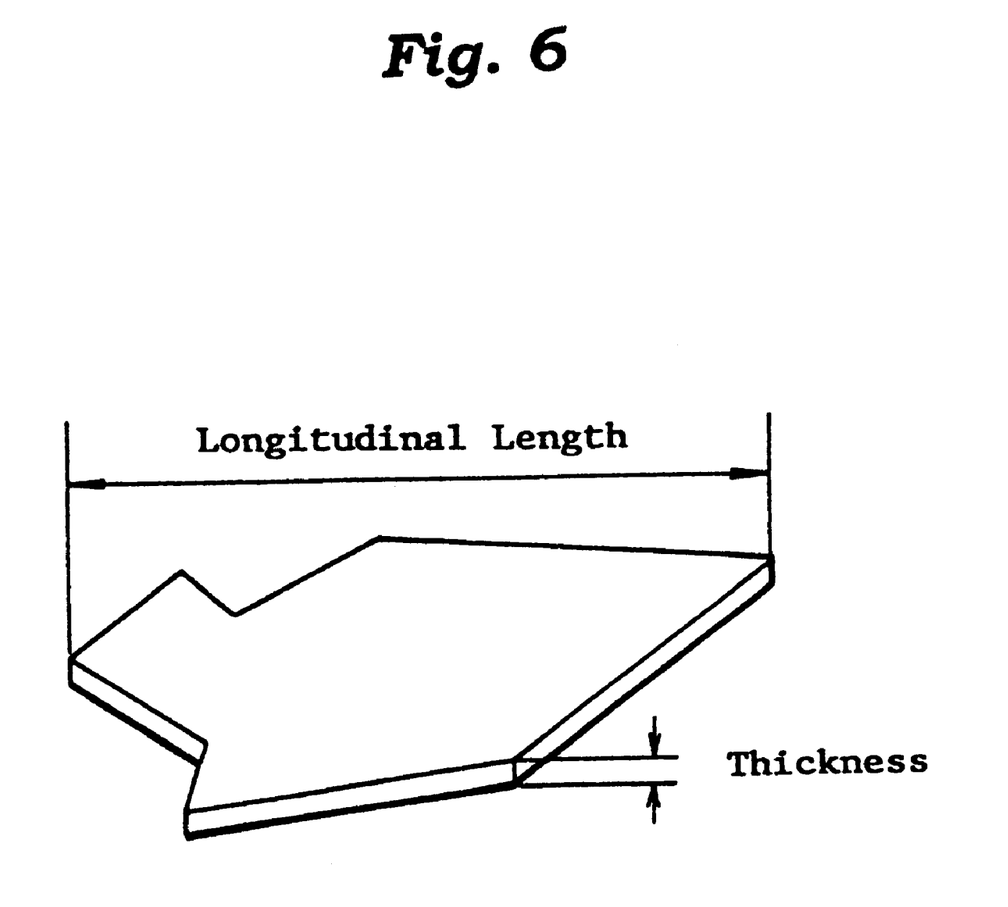
FIG. 6 is a perspective view of an example of a shape of crushed recovered polyester.

The recovered PEN and PET used in the above example and comparative examples were mainly in a shape of irregular polygonal flakes as shown in FIG. 6, and 70% or more had a thickness of 0.4 to 1.2 mm and a longitudinal length of 20 mm or less. They were prepared from unstretched, uniaxially stretched or biaxially stretched sheet of PEN or PET by crushing using a vertical type crusher ("HM-100", Orient).

What is claimed is:

1. A method of producing polyethylene naphthalate which comprises subjecting an ester-forming derivative consisting essentially of naphthalene dicarboxylic acid or its lower alkyl ester and a diol compound consisting essentially of ethylene glycol to ester exchange reaction or esterification to produce polyethylene naphthalate, wherein recovered polyethylene naphthalate resin is charged before beginning of effusion of alcohol or water which is a by-product of the ester exchange reaction or esterification.

2. The method of claim 1 wherein the recovered polyethylene naphthalate resin is added at a blending rate of 5 to 50 wt. % of produced polyethylene naphthalate including the recovered polyethylene naphthalate.

3. The method of claim 1 wherein the naphthalene dicarboxylic acid or its lower alkyl ester is 2, 6-naphthalene dicarboxylic acid dimethyl ester, and the alcohol is methanol.

4. A recovered polyester charging apparatus which comprises a slidable inner pipe inserted in a nozzle attached to a reactor, a driving mechanism for moving the inner pipe, and a feeding mechanism of crushed recovered polyester and inactive gas into the inner pipe.

5. The apparatus of claim 4 wherein the nozzle is provided a valve, and the inner pipe can slide penetrating through the valve while the valve is opened.

6. A method of charging crushed recovered polyester which comprises using a slidable inner pipe and streaming inactive gas in the inner pipe at a flow velocity of 10 cm/sec or more.

7. The method of claim 1 wherein the recovered polyethylene naphthalate has been crushed, and charged using a slidable inner pipe and streaming inactive gas in the inner pipe at a flow velocity of 10 cm/sec or more.

8. The method of claim 7 wherein inactive gas is also streamed on the outside of the inner pipe at a flow velocity of 10 cm/sec or more.

9. The method of claim 6 wherein the inactive gas is nitrogen gas.

* * * * *